Oct. 19, 1937.  J. M. CZESZCZICZKI, JR  2,096,507
FORMING CONFIGURATIONS ON NATURAL GROWTHS
Filed Dec. 28, 1936

Inventor
John M. Czeszcziczki, Jr.
By Frease and Bishop
Attorneys

Patented Oct. 19, 1937

2,096,507

UNITED STATES PATENT OFFICE 2,096,507

FORMING CONFIGURATIONS ON NATURAL GROWTHS

John M. Czeszcziczki, Jr., Madison, Ohio, assignor of one-half to Charles H. Draper, Cleveland, Ohio Application December 28, 1936, Serial No. 117,865

3 Claims. (Cl. 47—58)

The invention relates generally to the formation of natural growths while growing, and more particularly to a novel method of forming faces or like configurations on the exterior of bulb-shaped growths, such as pumpkins, squash, melons, and various vegetables and the like.

Faces or like configurations have been produced on pumpkins and the like by cutting or otherwise marring the shell in such a way as to simulate facial features, but considerable skill is required to produce a good likeness.

Moreover many pumpkins and the like are so unsymmetrical or distorted in shape that they are not suitable for having faces cut thereon.

By my novel method, the general shape or contour of a pumpkin or the like can be formed at the same time as the facial configuration, so that the pumpkin or other growth can be formed into the general contour of the head of a human or animal.

It is therefore an object of the present invention to provide a novel method of forming facial configurations on natural growths during the growing period.

Another object is to provide a method of forming faces and the like on natural growths without cutting or marring the same.

A further object is to provide a novel method of forming the general shape or contour of the growth at the same time the facial configuration is being formed.

A still further object is to provide a method of forming a natural growth into a particular contour and configuration without appreciably changing the character or quality of the edible part of the growth.

These and other objects are accomplished by the novel process comprising the present invention, which consists in enclosing a pumpkin or the like in a mold having the desired configuration on its inner surface, allowing the pumpkin to grow into and conform to the inner surface of the mold, and then removing the mold and allowing the pumpkin to ripen to any desired degree.

In the drawing forming part hereof—

Similar numerals refer to similar parts throughout the several views of the drawing.

In carrying out my novel method, I use a mold of rigid material, which may be metal such as cast iron, aluminum or brass, or non-metallic material such as glass and the like. The mold 10 is preferably made in two hollow substantially half sections indicated at 10 and 11, having mating surfaces 12 and 13 respectively.

Figures 1, 2:
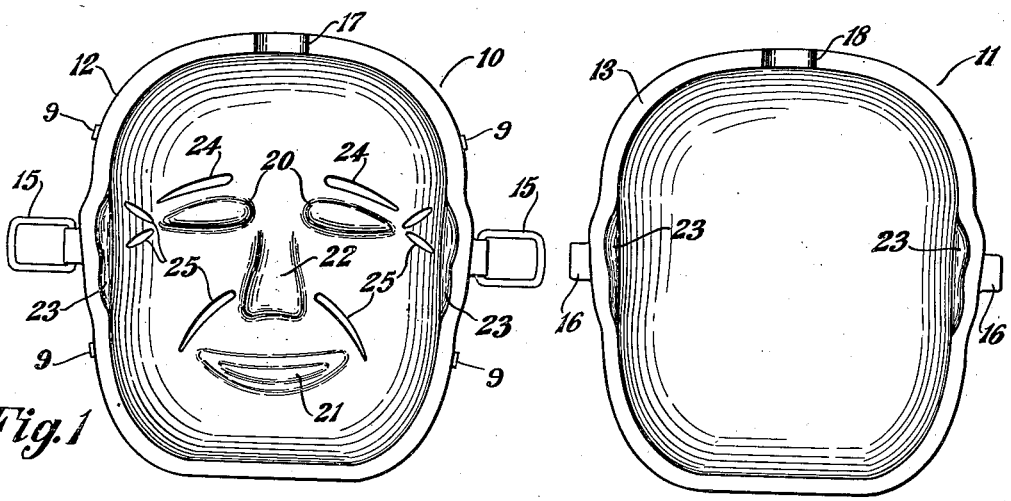
Figure 1 is an elevation looking toward the inside of one section of a mold for forming the growth.
Fig. 2 is a similar elevation of the other section of the mold.
Figures 3, 4:
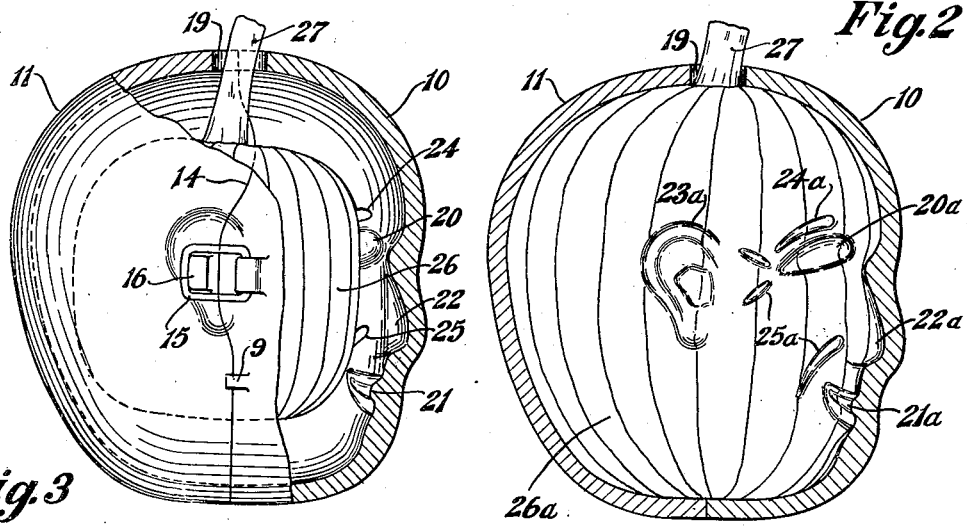
Fig. 3 is a sectional view partly in elevation showing the mold enclosing a pumpkin much smaller in size than the interior of the mold.
Fig. 4 is a similar sectional view showing the pumpkin after it has grown to conform to the interior surface of the mold.
Figure 5:
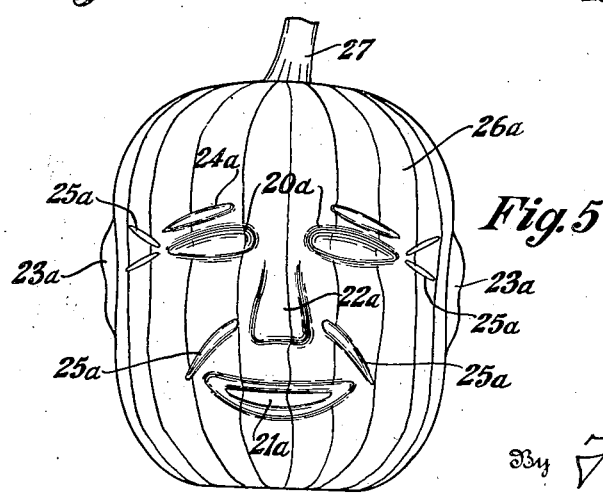
Fig. 5 is a front elevation of the pumpkin after the mold has been removed therefrom.

The mating surfaces are adapted to fit each other so as to form a globular or bulbous shell, as shown in Figs. 3 and 4, which may generally resemble a human head in shape. Preferably the mating surfaces are curved so as to form an irregular line of division of the mold, as shown at 14 in Fig. 3, and lugs 9 are provided on one mold section as 10 for overlapping the other section 11 at the division line, so that the mold sections will not slide relative to each other when they are clamped together.

Any suitable means for clamping the mold sections together may be provided, and may include rings 15 pivotally mounted on opposite sides of one mold section, as shown on mold section 10 adjacent the mating surface 12 thereof. The rings 15 are adapted to fit over and engage behind lugs 16 on the other mold section, for clamping the mold sections together, as shown in Fig. 3. The lugs 16 are shown on opposite sides of mold section 11, adjacent the mating surface 13 thereof.

The mating surface 12 of mold section 10 is provided at its top central portion with a substantially semi-circular notch 17, and the mating surface 13 of mold section 11 is likewise provided at its top central portion with a substantially semi-circular notch 18, so that when the mold sections are fitted together, the notches 17 and 18 form a circular opening indicated at 19 in Figs. 3 and 4.

One or both of the mold sections may be provided on the inner surface with any desired configuration in relief, the counterpart of which is to be formed on a bulb-shaped growth. As shown in the drawing, the inner surface of mold 10 has a facial configuration in which the eyes 20 and mouth 21 are raised portions and the nose 22 is a depression. The ears 23 are depressions and may be formed partly in mold section 10 and partly in mold section 11, as shown. Preferably, slots 24 may be provided through the mold wall above the eyes in the position of eyebrows, and similar slots 25 may also be provided through the mold wall in the position of facial creases or wrinkles adjacent the eyes and at each side of the nose and mouth, as shown. Obviously, other slots can be provided at other locations, if desired.

My novel method will be described in connection with forming the general contour of a pumpkin to resemble a head having a facial configuration thereon, but it will be understood that any natural bulb-shaped growth can be formed in a like manner and that the general shape and particular configuration can be varied as desired.

The present improved method consists in placing the mold sections 10 and 11 around an immature pumpkin, such as indicated at 26, while it is growing in the field, and clamping the mold sections tightly together by means of the rings 15 and lugs 16. The stem 27 of the pumpkin is passed through the opening 19 in the mold and is not detached from the vine.

The pumpkin may be enclosed in the mold any time after it has formed and is still immature, which may be from one to six weeks after blossom time, for example. The pumpkin must be enclosed in the mold while it is still materially smaller than the inside cavity of the mold so that it will conform to the inner surface of the mold by growth.

During the growing period, the slots 24 and 25 give access to outside air for ventilation, and as the shell of the pumpkin conforms to the shape and configuration of the mold, it will tend to grow into said slots somewhat so as to produce raised portions 24a and 25a on the pumpkin corresponding to said slots.

After the pumpkin has grown sufficiently to completely fill and conform to the inner surface of the mold, as shown at 26a in Fig. 4, the mold is removed without detaching the stem 27 from the vine, and the pumpkin will have the general shape of a human head. The facial configuration, which has been formed as the counterpart of the configuration of the mold, has eyes appearing as depressions 20a, the mouth as a depression 21a, and the nose and ears as raised portions 22a and 23a respectively.

The pumpkin may be allowed to continue to grow for as much as several months after the mold is removed, and to ripen, and will retain the general shape of a human head and the particular facial configuration of the mold, although the size may increase proportionately.

Pumpkins formed according to my novel method will acquire the usual yellow color when ripe, and the edible part is not appreciably affected in character or quality.

Obviously, the various facial features or configurations may be painted if desired, or may be cut out to provide a novel jack-o'-lantern.

I claim:

1. The method of forming a natural bulb-shaped growth which consists in enclosing an immature growth in a mold having a facial configuration on its inner surface, allowing the growth to grow into and conform to the inner surface of the mold, removing the mold, and then allowing the growth to continue growing before detaching it from its plant.

2. The method of forming a pumpkin and the like to simulate a human head, which consists in enclosing the pumpkin while immature in a relatively large mold having a facial configuration on its inner surface without detaching the pumpkin from its vine, allowing the pumpkin to conform to the mold by growth, and then removing the mold.

3. The method of forming a pumpkin and the like to simulate a human head, which consists in enclosing the pumpkin while immature in a mold having a facial configuration on its inner surface without detaching the pumpkin from its vine, allowing the pumpkin to conform to the mold by growth, removing the mold, and then allowing the pumpkin to ripen before detaching it from its vine.

JOHN M. CZESZCZICZKI, Jr.